United States Patent
Bailis et al.

(10) Patent No.: US 6,434,652 B1
(45) Date of Patent: *Aug. 13, 2002

(54) HOT PLUG SUBSYSTEM FOR PROCESSOR BASED ELECTRICAL MACHINE

(75) Inventors: Robert Thomas Bailis, Cary; Thomas Lee Bonds, Jr., Raleigh; Roy Lee Draughn, Cary; Alvin Dean Genzlinger, Apex; David John Jensen, Raleigh; Charles Steven Lingafelt, Durham; Brian Scott Oakley, Burlington; Michael James Ward, Fuquay-Varina, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,743

(22) Filed: Jul. 21, 2000

Related U.S. Application Data

(63) Continuation of application No. 08/970,270, filed on Nov. 14, 1997, now Pat. No. 6,125,417.

(51) Int. Cl.$^7$ ................................................ G06F 13/00
(52) U.S. Cl. ...................... 710/302; 710/301; 710/305; 710/314; 710/62; 710/63
(58) Field of Search ................................. 710/101–103, 710/110, 129, 2, 113, 62, 63, 72, 269, 300–304, 305, 314; 361/686

(56) References Cited

U.S. PATENT DOCUMENTS

| | | | |
|---|---|---|---|
| 4,835,737 A | 5/1989 | Herrig et al. ................ 364/900 |
| 5,157,771 A | 10/1992 | Losi et al. .................... 395/325 |
| 5,182,780 A | 1/1993 | Robertson ..................... 385/14 |
| 5,196,712 A | 3/1993 | Nguyen et al. .............. 250/551 |
| 5,210,855 A | 5/1993 | Bartol .......................... 395/500 |
| 5,340,340 A | * 8/1994 | Hastings et al. .............. 439/64 |
| 5,473,499 A | 12/1995 | Weit ............................. 361/58 |
| 5,530,302 A | 6/1996 | Hamre et al. ................ 307/147 |
| 5,572,395 A | 11/1996 | Rasums et al. ................ 361/58 |
| 5,579,491 A | 11/1996 | Jeffries et al. .............. 395/283 |
| 5,602,717 A | 2/1997 | Leshem et al. .............. 361/685 |
| 5,606,704 A | 2/1997 | Pierce et al. ................ 395/750 |
| 5,625,238 A | * 4/1997 | Ady et al. ................... 307/147 |
| 5,784,576 A | 7/1998 | Guthrie et al. .............. 395/283 |
| 5,793,987 A | 8/1998 | Quackenbush et al. ..... 395/280 |
| 5,796,185 A | 8/1998 | Takata et al. ................ 307/140 |
| 5,798,951 A | * 8/1998 | Cho et al. ................. 364/708.1 |
| 5,875,308 A | 2/1999 | Egan et al. .................. 395/283 |
| 5,881,251 A | 3/1999 | Fung et al. .................. 395/283 |
| 5,889,965 A | 3/1999 | Wallach et al. ............. 395/283 |
| 5,894,561 A | * 4/1999 | Kuan et al. .................. 710/103 |
| 5,930,110 A | * 7/1999 | Nishigaki et al. ........... 361/686 |
| 5,991,838 A | * 11/1999 | Swindler et al. ............ 710/101 |
| 6,125,417 A | * 9/2000 | Bailis et al. ................. 710/103 |
| 6,141,711 A | * 10/2000 | Shah et al. .................. 710/103 |

* cited by examiner

Primary Examiner—Peter Wong
Assistant Examiner—Raymond N Phan
(74) Attorney, Agent, or Firm—Joscelyn G. Cockburn

(57) ABSTRACT

A device that enables a card to be hot-plugged into a socket on a processor-base machine includes a signal bus arbitrator, a signal bus switch, a power bus switch, a cover plate switch, status signals and a controller. The controller monitors the status signals and other signals from the cover plate switch and the signal bus arbitrator to generate control signals that activate the power bus switch and the signal bus switch to control power and signal transmitting facilities at the socket.

8 Claims, 4 Drawing Sheets

HOT PLUG SUBSYSTEM FOR PROCESSOR BASED ELECTRICAL MACHINE

This application is a Continuation of Ser. No. 08/970,270 filed Nov. 14, 1997, now U.S. Pat. No. 6,125,417, issued Sep. 26, 2000 and assigned to the same assignee as that of the present invention.

BACKGROUND OF THE INVENTION

1. Field of the Invention

The present invention relates to electrical machines in general and, in particular, to processor-based electrical machines that can be serviced while performing its assigned tasks.

2. Prior Art

Because of increasing dependency on electrical machines in general, and processor-based machines in particular, there is a need for processor-based machines (hereafter called computers) which can be serviced while performing regular functions. A typical computer includes a motherboard and/or backplane with a plurality of slots. The slots are the receptacles for adapters or cards which can be used to expand the capacity and functionality of the computer. Occasionally, adapters become defective and have to be replaced. To provide uninterrupted service, the computer has to be fully operational during removal or insertion of the adapters. In addition, the removal and/or insertion must not have deleterious results on the computer operations.

A technique termed "hot plugging", "hot swap", or variations thereof enables the insertion and/or removal of adapters while the computer is operational. Even though hot plugging is a desirable goal, if not done properly, it can cause problems which over time adversely affect the operability of the computer system. A likely problem is pitting of the metal used on the connecting pins located on the adapter and the connector. A main cause of pitting is believed to be electrical arcing which occurs at the electrical contacts while interconnection is made or broken. Another problem is electrical noise which can adversely affect the performance of the system. The cause of this noise is believed to be the large change in current over a short period of time (di/dt) at the instance when the connection is made between power pins on the card and the socket. This problem is particularly severe when hot-plugging an adapter card with a large amount of decoupling capacitance. Finally, the large surge of current is likely to cause voltage transients onto the computer system backplane. The voltage transients can cause loss of data, incorrect program execution and, in severe situations, damage to delicate hardware components.

The prior art has recognized the need for precautions and have provided system and method which go a long way to minimize some of the problems. The populous prior art solution is the use of "staggered-pins" to sequence power and signals from the host system to the card being hot plugged. In some implementation, additional electrical circuits are used to charge the card capacitance in a controlled way. The "staggered pins" means that the lengths of the pins making the interconnection varies. Usually, the power carrying pins are longer than the signal carrying ones. Consequently, when the card is inserted into the connector, power is established before signaling. Likewise, when the card is removed, the signal pins are disconnected prior to the power pins. One of the problems with this popular solution is that connectors with special pins are required. Another problem is that staggered pins necessitate the use of proprietary adapter design. The cost associated with fabricating and manufacturing connectors with special pins unnecessarily increases the price of the Box. As used in this document, "Box" refers to the system in which the card is plugged.

Another problem with the "staggered pins" arrangement is that the connect/disconnect time is sometimes too short for the system to perform an orderly logical shut down and/or "bring-up" of the adapter. The connect/disconnect time covers the time delay for the long/short power/signal pins on the card to contact/disconnect the power/signal pins on the system to which the adapter is inserted. Usually, the connect/disconnect times, for the "staggered-pins" arrangement, are in the order of milliseconds. Longer times are required for adequate shut-down and/or bring-up of complex adapters. This time may grow even longer as more functions are placed on the adapter.

Consequently, there is a need for a hot-plug system that affords sufficient time to shut down and/or bring-up the functions on the adapter before the adapter is inserted or removed from the system.

A less populous but effective solution uses electrical circuits and switches for coupling the card's power and signal busses to the system's power and signal busses. U.S. Pat. No. 5,473,499, "Hot Pluggable Motherboard Bus Connection Method", by Steven Weir, is an example of the solution. Even though the patent teachings are in the right direction, because the pins in the connector are of the same length rather than staggered, it too has drawbacks which the below invention solves.

One of the drawbacks is that the patent requires a predetermined time delay between connection of the power busses and the signal busses. The predetermined time delay enables the voltages on the card to be stabilized before the signal busses are connected. It appears as if operator's intervention is required to set the predetermined time which may be different for different systems and even in the same system, may have to change as components age. Due to the likelihood of human error, there is a need to provide a fully automated system which does not require human intervention, other than to insert/remove the card.

SUMMARY OF THE INVENTION

It is a general object of the invention to provide a more efficient and effective hot plug system than was hereto fore been available.

It is another object of the invention to provide a fully automated hot plug system which does not require human intervention other than to insert/remove the card from the system.

It is still another object of the present invention to provide a hot plug system that allows the card to be removed without damaging card components.

It is yet another object of the present invention to allow industry standard adapters (such as PCI) to be used in the system without major changes to circuitry on the adapter.

These and other objectives are achieved by a hot plug system which includes a controller responsive to a card power good signal and card logic good signal to generate control signals which activate a Card Bus Switch and Card Power Switch to couple the Card Signal Bus to the System Signal Bus and the Card Power Bus to the System Power Bus. In addition, the controller obtains control of the system bus prior to any attempt of closing the Card Bus Switch. By doing so when the signal busses (card and system) are coupled together, no other device has access to the system bus. Therefore, any disturbance on the bus would not affect system performance. By ensuring that the card is in good operational mode before connecting the signal busses system integrity is enhanced.

In one embodiment, the controller generates and provides a card reset signal to be used in shutting down the card prior to disconnecting power busses and signal busses, respectively.

These and other features of the invention and advantages will be more clearly understood from the drawings and description of a preferred embodiment.

DETAILED DESCRIPTION OF THE PREFERRED EMBODIMENT

Figure 1:
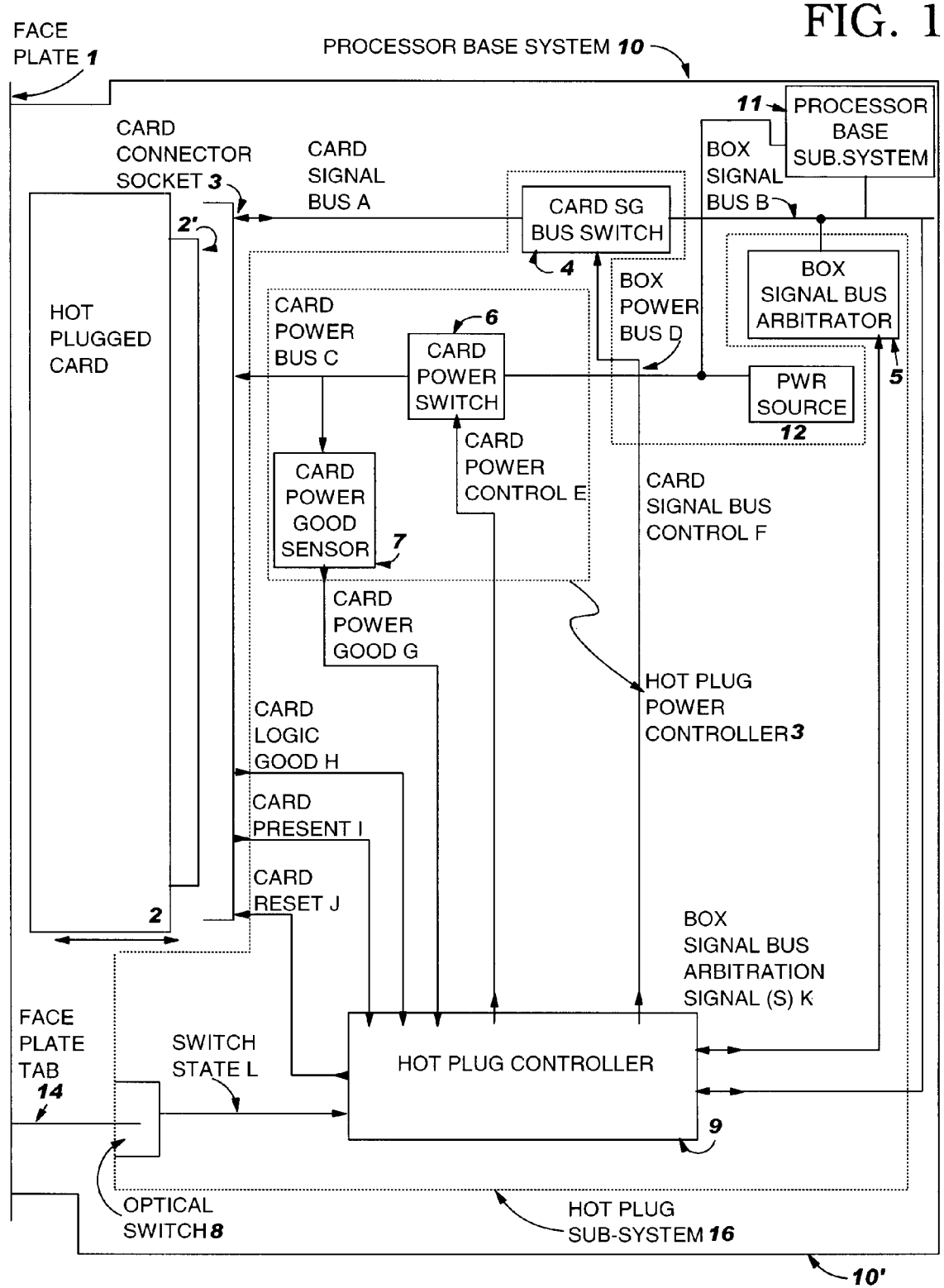
FIG. 1 illustrates a processor-based system according to the teachings of the present invention.

FIG. 1 shows a functional representation of the Processor Base System 10 according to the teachings of the present invention. The Processor Base System 10 may be a personal computer (PC), workstation or any machine using a microprocessor as a controller. Included in this group would be network servers, hubs, routers, PC's or similar machines. The Processor Base System 10 includes Processor Base Subsystem 11, Power Supply 12, Card Connector Socket 3, Faceplate 1, Hot Plugged Card 2, position to be inserted into Card Connector Socket 3 and Hot Plugged Sub-System 16. The Hot Plugged Card 2 is a circuit card on which a plurality of electronic components are placed for performing desired functions. Such cards are widely known in the prior art and a detailed description will not be given. It should be noted that Card 2 has Connector Section 2' which has a plurality of electrical contacts for coacting with similar contacts when the card is inserted in Card Connector Socket 3. The electrical contacts of the Connector Section 2' can be electrical pins or card edge tabs. It should be noted that the electrical contacts on Connector 2' are all the same length as opposed to the prior art which uses different lengths.

Still referring to FIG. 1, the Processor Base System 10 further includes a Housing 10' to which the Faceplate 1 is connected. Preferably, the connection between the faceplate and the Housing 10' is such that the faceplate provides the EMC shielding to Processor Base System 10. For purposes of description, the Processor Base System 10 will be referred hereinafter as Box 10. A Switching Device 8 is mounted to Housing 10'. A Faceplate Tab 14 is connected to the faceplate and is positioned so as to activate the Switch Device 8. In the preferred embodiment of this invention, the Switch Device 8 is an optical switch and the Faceplate Tab 14 is a relatively flat piece of material which, when withdrawn or inserted between the light emitting and light receiving elements of the optical switch, creates a change in condition so that a level charge is generated on the conductor labeled Switch State L.

Still referring to FIG. 1, Processor Base Subsystem 11 represents the portion of the Processor Base System 10 that is programmed to perform desired functions. Depending on the type of Box 10, the components in Processor Base Subsystem 11 will be different. However, regardless of the type of box, it will contain a processor (Central Processing Unit, CPU) having an operating system software, program drivers, storage, memory, etc. Stated another way, all that is necessary to make a microprocessor base system operational is represented by Processor Base Subsystem 11. In addition, Power Source 12 provides the power for the Box 10. Power Bus D is connected to Power Source 12 and provides the power for the box. Likewise, Box Signal Bus B is the processor signal bus and provides signals for the box. The signal bus includes data, address, clock and control signals. The Hot Plug Sub-System 16 electronically couples the Card Signal Bus A to the Box Signal Bus B and the Card Power Bus C to the Box Power Bus D. The Card Signal Bus A and the Card Power Bus C terminate on appropriate pins positioned within Card Connector Socket 3.

When the Card 2 is plugged into the Socket 3 or removed from the Socket 3, the Controller 9 makes sure that even though the box is in full operational mode, the insertion or removal does not cause a deleterious effect on the box. For purposes of discussion, the signal bus is shown as two sections: namely, Box Signal Bus B and Card Signal Bus A. The Box Signal Bus B is coupled to Processor Base Subsystem 11 while Card Signal Bus A is coupled to Card Connector Socket 3. A similar structure is assigned to the power bus. In particular, the Box Power Bus D is connected to the Power Source 12 and the Card Power Bus C is connected to the Card Socket 3. The Hot Plug Sub-System 16 includes Card Bus Switch 4 coupled to the Box Signal Bus B and the Card Signal Bus A. The Card Bus Switch 4 provides the means of connecting and disconnecting the Card Signal Bus A to the Box Signal Bus B. When Card 2 is fully inserted in Card Connector Socket 3, the electrical continuity is maintained between the card, the Card Signal Bus A and the Box Signal Bus B if the card bus switch is in the closed state. If the switch is in the open state, there is electrical discontinuity between the Box Bus Signal B and the Card Signal Bus A. Preferably, the Card Bus Switch 4 should be of the type that has low on resistance without introducing propagation delay or additional ground bounce noise. Also, the switch may include a series termination resistor to reduce reflection in certain high speed applications. The prior art has several switches which can be selected for use. For example, Bus Switches QS32X2384 and QS32X2384, manufactured by QUALITY SEMICONDUCTOR, INC. are suitable candidates. The QS32X2384 includes internal 25 Ohm series termination resistors to reduce reflection noise in high speed application.

A digital signal on the conductor labeled Card Signal Bus Control F (FIG. 4) provides a control signal for activating Card Bus Switch 4. The Box Signal Bus Arbitrator 5 is connected to Box Signal Bus B and over a conductor labeled Box Signal Bus Arbitration Signals K to Hot Plug Controller 9. The Box Signal Bus Arbitrator 5 provides access control for the Box Signal Bus B. As will be explained below, prior to any attempt to switch Card Bus Switch 4 from an open or closed state, the Hot Plug Controller 9 obtains control of the box signal bus via arbitration to the Box Signal Bus Arbitrator 5. When Hot Plug Controller 9 has control of the bus, it will enable or disable Card Bus Switch 4. If the Hot Plug Controller 9 does not have control of the bus, it will not activate or de-activate the Card Bus Switch 4. This method of driving the bus control switch makes it less likely to cause problems in the box because when the bus is switched, no other device in the box should be using the bus.

Still referring to FIG. 1, the Hot Plug Sub-System 16 further includes the Hot Plug Power Controller 3 that interconnects the Box Power Bus D and the Card Power Bus C. The Hot Plug Power Controller 3 regulates and monitors the voltage output from Power Source 12 and generates the Card Power Good Signal G on the line or conductor labeled Card Power Good G. The Hot Plug Power Controller 3 may be an off-the-shelf device such as HIP1011 PCI Hot Plug Controller manufactured by Harris® Semiconductor.

In an alternate embodiment, the Hot Plug Power Controller 3 is fabricated from Card Power Switch 6 and Card Power Good Sensor 7. Card Power Switch 6 interconnects the Card Power Bus C and the Box Power Box D. The line labeled Card Power Control E interconnects the Card Power Switch 6 to the Hot Plug Controller 9. As will be described subsequently, the Hot Plug Controller 9 generates card power control signals for controlling the Card Power Switch 6. The Card Power Switch 6 provides the facility for interconnecting the Card Power Bus C and the Box Power Bus D. In addition to the connection function, the Card Power Switch 6 provides overcurrent protection so that a large in-rush of current does not flow to the card when it is hot plugged in Socket 3. To this end, the Card Power Switch 6 ramps the voltages of the Card Power Bus C at a controlled rate. Also, if a short circuit or overcurrent condition exists on the card, the card power switch turns off the voltage. The Card Power Good Sensor 7 is connected to the Card Power Bus C and to the Hot Plug Controller 9 by a conductor labeled Card Power Good G. The Power Good Sensor 7 monitors the Card Power Bus C and when the voltage on the card stabilizes, outputs a signal which is used by the Hot Plug Controller 9.

A Card Logic Good H Conductor interconnects the Card Socket 3 to the Hot Plug Controller 9. When the logic on the card is tested good, a signal is generated on the Card Logic Good H and is used by the Hot Plug Controller 9. Likewise, the line or conductor labeled Card Present I transmits a signal from the socket to the Hot Plug Controller 9 when it is determined that the card is present in the connector socket. The line labeled Card Reset J interconnects the Hot Plug Controller 9 to the Card Connector Socket 3. Prior to removing the card from the socket, the Hot Plug Controller 9 generates and transmits a card reset signal on the line labeled Card Reset J. The signal is used on the card to reset and puts the card in a state where it can be removed from the socket without any adverse effect to the circuits on the card. Finally, the Optical Switch 8 outputs a signal, on the line labeled Switch State L, to the Hot Plug Controller 9 when the Faceplate 1 is removed from Housing 10' or is attached to Housing 10'. It should be noted that the Faceplate Tab 14 mounted to the faceplate causes a change in signal output from Optical Switch 8 when the faceplate is connected or removed from the box. As stated above, the Hot Plug Controller 9 provides the necessary signals for closing or opening the Card Bus Switch 4 and the Card Power Switch 6. To this end, the Hot Plug Controller 9 monitors switch state signal on Switch State Signal line L, card present signal on Card Present Signal line I, card good signal on Card Logical Signal line H, and card power good signal on the Card Power Good Signal line G. The Hot Plug Controller 9 also communicates over Box Signal Bus Arbitration Signals line K with the Box Signal Bus Arbitrator 5. When access is granted to the Hot Plug Controller, it generates card signal bus control signals on the Card Signal Bus Control F line to drive the Card Bus Switch 4. Likewise, the Hot Plug Controller 9 generates the card power control signal on Power Control E line for controlling the Card Power Switch 6.

Figure 4:
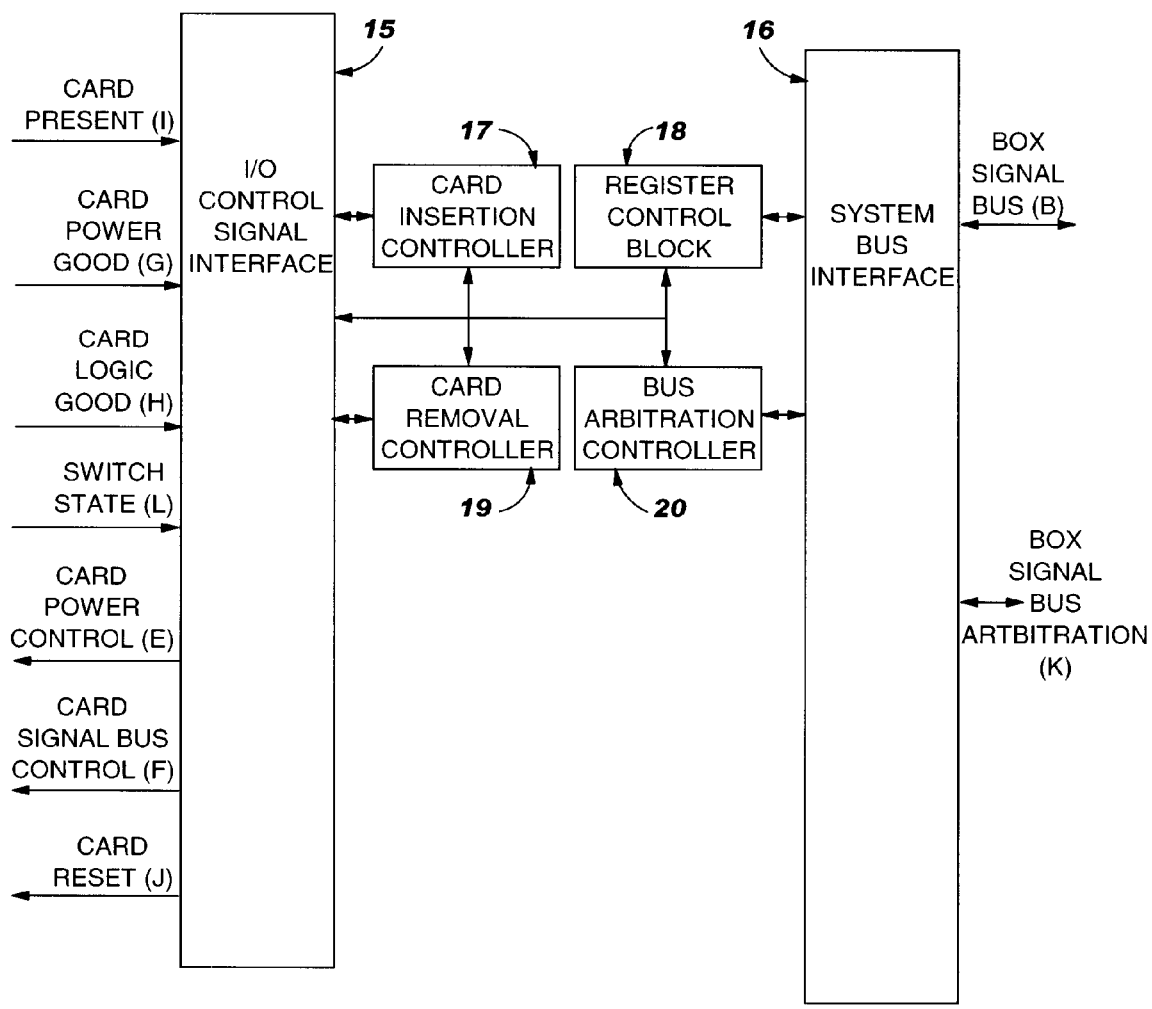
FIG. 4 shows a block diagram of the Hot Plug Controller.

Referring now to FIG. 4, a detailed block diagram for the Hot Plug Controller 9 (FIG. 1) is shown. The Hot Plug Controller includes I/O Control Signal Interface 15, System Bus Interface 16, Card Insertion Controller 17, Register Control Block 18, Card Removal Controller 19 and Bus Arbitration Controller 20. The Hot Plug Controller can be implemented in several different ways. Our implementation chooses to use a CPLD (Complex Programmable Logic Device) from Altera® for the Hot Plug Controller. However, the controller could just as easily be implemented in an FPGA (Field Programmable Gate Array) or an ASIC (Application Specific Integrated Circuit). The physical implementation does not affect the desired function.

The I/O Control Signal Interface Block 15 is responsible for providing the means by which the Card Insertion and Card Removal Controllers 17 and 19 interface to the External Hot Plug Control Signals E, F, G, H, I, J and L. This block is comprised of standard CMOS/TLL driver and receiver logic circuitry.

The System Bus Interface 16 is responsible for interfacing to the Box Signal Bus B and the associated Arbitration Signals K. This interface is comprised of a system clock and all required address, data and control signal required for box signal bus access. The system bus interface provides system processor access to and control of the Hot Plug Controller through the Register Control Block 18. In addition, the System Bus Interface 16 provides the external interface required by the Bus Arbitration Controller 20.

The Bus Arbitration Controller 20 is responsible for implementing the system bus arbitration scheme. This involves requesting the bus and taking ownership of the bus using the proper method. The Bus Arbitration Controller 20 requests the bus on behalf of the Card Insertion Controller 17 or Card Removal Controller 19 and indicates bus ownership to the requesting controller when the bus has been acquired. The Bus Arbitration 20 interfaces to the Box Signal Bus Arbitration Signals K through System Bus Interface 16.

Figure 2:
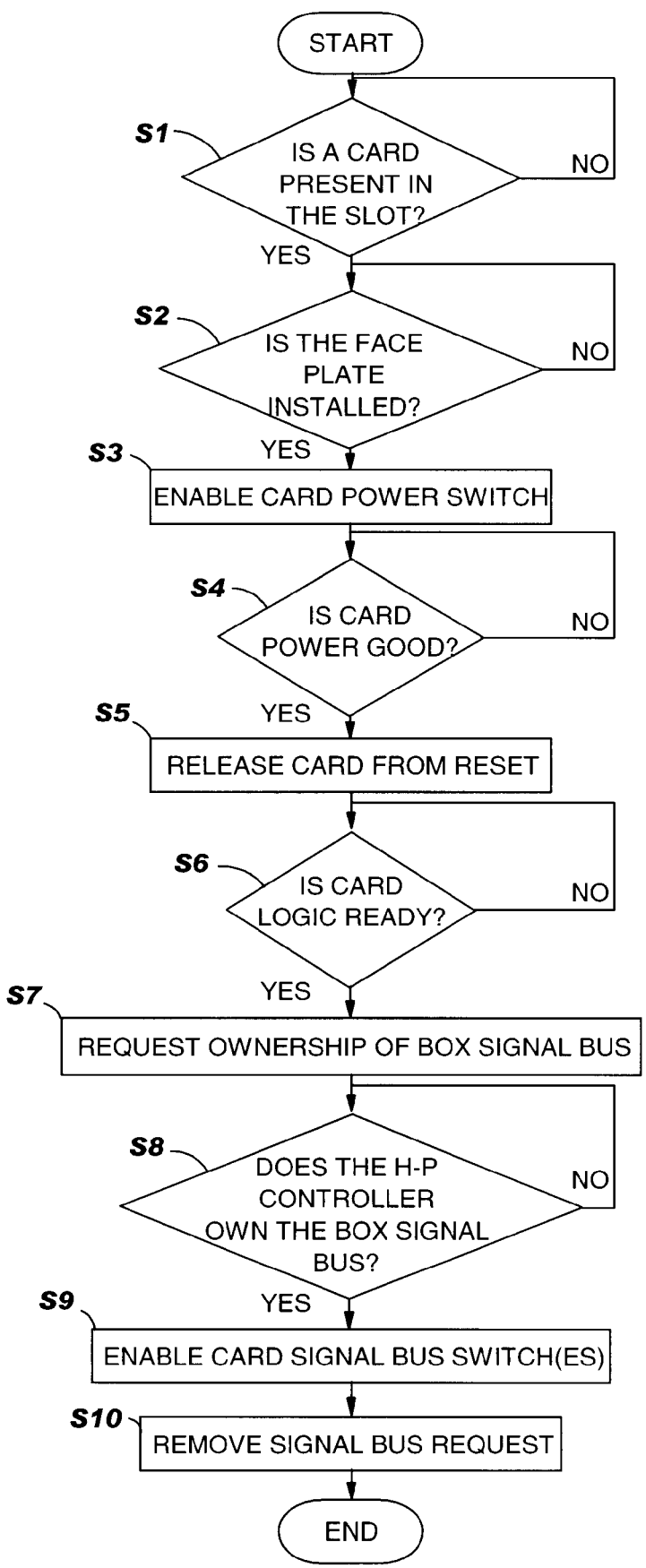
FIG. 2 shows a flowchart of the process steps used by the controller to allow removal of the card.

The Card Insertion Flowchart shown in FIG. 2 is implemented in the Card Insertion Control Block 17. Preferably, the flowchart is implemented as a state machine. Inputs to the state machine come from the I/O Control Signal Interface 15. Also, control outputs from the state machine are driven externally by the I/O Control Signal Interface 15. Card Insertion Controller 17 arbitrates for the system bus through the Bus Arbitration Controller 20. The current state may be monitored and controlled through registers in the Register Control Block 18.

Figure 3:
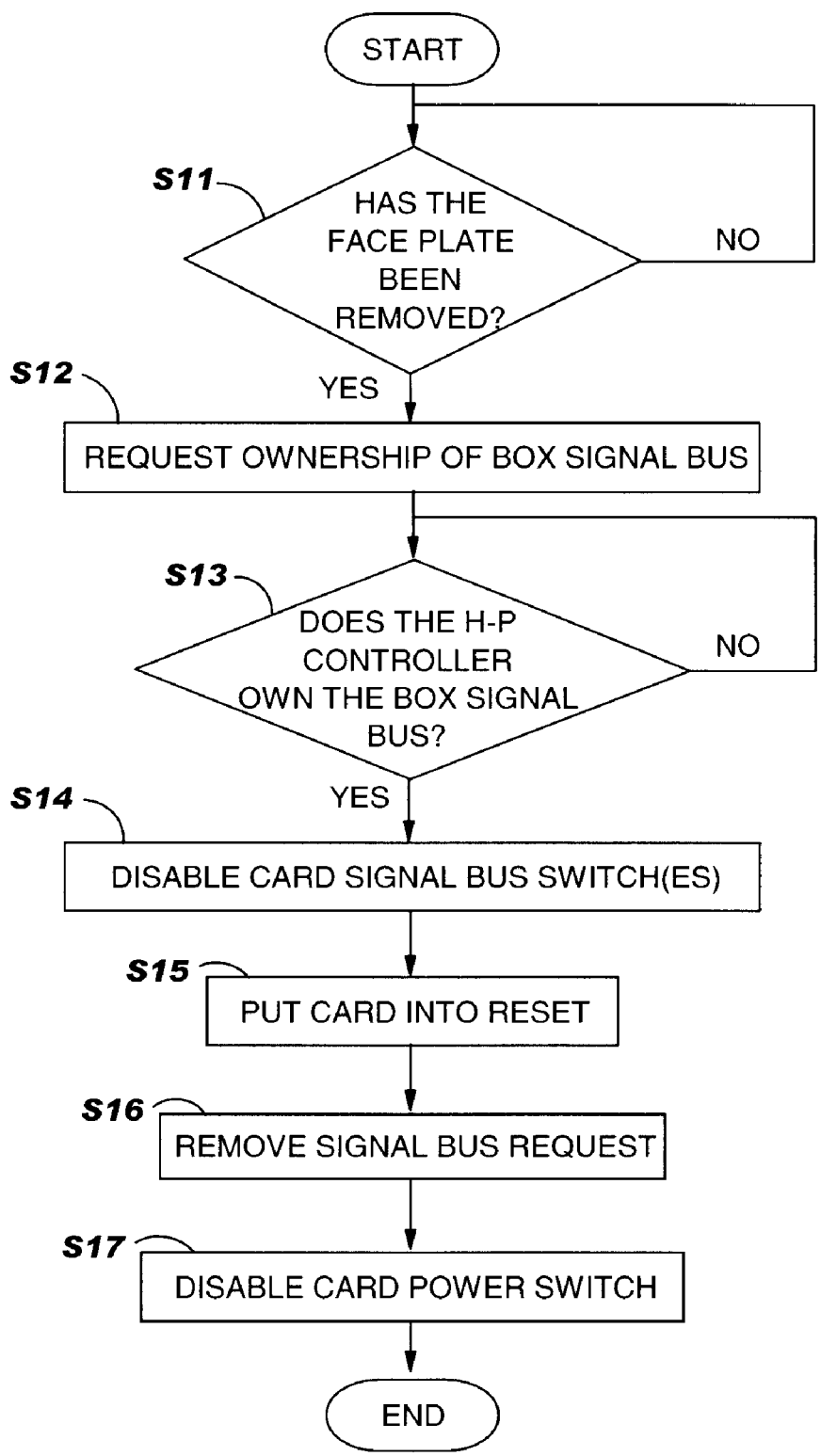
FIG. 3 shows a card insertion flowchart used by the Hot Plug Controller.

The Card Removal Control Block 19 is responsible for implementing the steps set forth in the Card Removal Flowchart shown in FIG. 3. Preferably, the flowchart is also implemented as a state machine. Inputs to the state machine come from the I/O Control Signal Interface 15. Also, control outputs from the state machine are driven externally by I/O Control Signal Interface 15. Card Removal Controller 19 arbitrates for the system bus through the Bus Arbitration Controller 20. The current state may be monitored and controlled through registers in the Register Control Block 18.

The Register Control Block 18 provides the system processor (or software) status and control of the Hot Plug Controller. This block is a grouping of registers that are accessed through the System Bus Interface 16. The registers provide status of the Hot Plug Input Signals G, H. I and L through the I/O Control Signal Interface 15. Also, the registers provide control over all Hot Plug Output Signals E, F and J through the same means. In addition, the Register Control block provides control of the Card Insertion 17 and Card Removal 19 controllers.

Referring to FIG. 1 for the moment, the control signals Card Logic Good H, Card Power Good G, Card Reset J and Card Present I will be described.

The Card Power Good G is a digital output signal that indicates that the voltage(s) on the Card Power Bus C is/are stabilized within its appropriate limits. In applications where there are multiple voltages on the Card Power Bus C, the Card Power Good G signal may be a single line that logically ANDs the status of all voltages on the Card Power Bus C. The circuity to generate this signal can consist of a voltage comparator and a voltage reference set at the appropriate limit.

The Card Logic Good H is a digital output signal from the Hog Pluggable Card 2 that indicates its status to the Hot Plug Control 9. This is an optional signal that is generated by the Hot Pluggable Card and is asserted when a successful diagnostic procedure has been completed. The output can be a bit from a status register (flip/flop) or from combinatorial logic.

The Card Present I is a digital output signal that is provided by the Hot Plugged Card 2 when the card is inserted into the Card Connector Socket 3. In certain applications, it may be necessary to have multiple Card Present I signals at different locations on the Card Connector 3 to detect if the Hot Pluggable Card 2 is inserted properly. This signal is generated by hardwiring a pin of the Hot Pluggable Card's edge connector to ground that connects to the Card Present Signal I of the Card Connector Socket 3.

Finally, the Card Reset J is a digital input signal that resets the Hot Plugged Card 2. This signal is generated by the Hot Plug Controller 9 and it is independent from the system reset. This allows full control of the reset sequence.

Having described the Processor Base System 10 including the Hot Plug Sub-System 16 that controls the hot plugging of a Card 2 into/from the Card Connector Socket 2, a flowchart of the process used by the Hot Plug Controller 9 to enable the card to be successfully plugged into the card connector will now be given.

FIG. 2 shows the card insertion flowchart. After the start routine, the algorithm descends into block S1 where the Hot Plug Controller tests to see if the card is inserted in the slot. This is done by monitoring the signal on Card Present I conductor. If the card is not in the slot, the algorithm loops. If the card is in the slot, the algorithm descends into block S2 where it tests to see if the faceplate is installed. This is done by monitoring the Switch State L line for the switch state signal. As stated previously, the Optical Switch 8 outputs a level change on the Switch State L line when the Faceplate Tab 14 moves relative to the light emitting/light receiving device. If the faceplate is not installed, the algorithm loops. If it is installed, the algorithm descends into block S3 where it enables the card power switch via a card power control signal on Card Power Control line E. With the switch activated to the closed position, the Card Power Bus C is coupled to Box Power Bus D and power is provided to the card. It is assumed at this time that the card is now plugged into the connector slot.

Still referring to FIG. 2, the program then descends into block S4 where it tests to see if the card power is good. This test is done by sampling the card power good signal on Card Power Good G line. If the card power is bad, the algorithm loops. If the card power is good, the algorithm descends into block S5. In block S5, the reset signal is generated and outputted on Card Reset J line. As stated previously, the reset signal is used on the card to reset the card into an inactive or active state. The algorithm then descends into block S6 where it tests to see if the card logic is ready. This is done by sampling the signal on the Card Logic Good Signal H line. The algorithm loops if the card logic ready signal step 6 indicates that the card logic is not ready. If the card signal indicates that the card logic is ready, the algorithm (Note: If Logic Ready signal is not used, then line defaults to Active Ready State) descends into block S7 where the Hot Plug Controller requests ownership of the Box Signal Bus over the signal line labeled Bus Signal Bus Arbitration Signals K. The algorithm then descends into block S8 where it checks to see if the hot plug (H-P) controller has control of the bus. This is made possible by the Box Signal Bus Arbitrator 5 outputting a grant signal. If the grant signal is not present, the algorithm loops. If the Grant Signal is present, the algorithm descends into block S9. In block S9, the algorithm enables the Card Bus Switch 4 via signals on the line labeled Card Signal Bus Control F. The algorithm then descends into block S10 where it removes the request for use of the bus. At this point, the card is fully inserted, the voltages are in order and there is electrical continuity between the power bus of the system and the card, and the signal bus of the system and the card. The algorithm then exits via the end block.

FIG. 3 shows a flowchart of the algorithm used in the Hot Plug Controller when a card is removed from Card Socket 3. The algorithm starts at block S11 through the start block. In block S11, the program checks to see if the faceplate has been removed. This is done by the state of the signal on the Switch State Signal L line. If the faceplate has not been removed, the algorithm loops. If it has been removed, the algorithm descends into block S12 where it issues a request for ownership of the Box Signal Bus. As stated previously, the request and communication for using the bus is done via the Bus Signal Bus Arbitrator 5. The algorithm then descends into block S13 where it checks to see if the Hot Plug Controller is given control of the bus. If not, the algorithm loops. If yes, the algorithm descends into block S14 where it disables the Card Signal Bus Switches 4 via the Card Signal Bus Control F. The algorithm then descends into block S15 where it generates and outputs a reset pulse on Card Reset J line. The algorithm then descends into block S16 where it removes the request signal to the box signal bus arbitrator. The algorithm then descends into block S17 where it disables the Card Power Switch 6 by issuing signals on the Card Power Control E line and exits through the end block.

Because the card cannot operate with the faceplate removed EM (electromagnetic) contamination due to radiation from operating the card is eliminated.

The Hot Plug Sub-System does not require operator's intervention, other than inserting/removing the card. Consequently, human error, such as removing/inserting the wrong card, is mitigated.

Even though the invention has been described with reference to specific embodiments, it is possible that one skilled in the art could conceive of many variations. Notwithstanding, all such variations are included within the intended scope of the present invention as defined in the following claims.

What is claimed is:

1. In a processor based system including a housing, an EMC cover plate, a programmed processor, a signal bus coupled to said processor, a power supply with a power bus providing power, receptacle for receiving card and a hot plug sub-system for controlling insertion/removal of a card from said receptacle while the processor-based system is fully operational, said hot-plug sub-system including:

a power bus switch;

a first signal line providing activation signals for said power bus switch;

a switch coupled to said housing for sensing movement of the EMC coverplate relative to the housing;

a card present signal line providing a signal Indicating card presence in said receptacle; and a Hot Plug Controller that correlates signals from the switch and the card present signal line to generate signals on the signal line that enables said power bus switch to couple the power bus to said receptacle.

2. A hot plug subsystem comprising:

a housing;

a card connector socket, mounted in said housing;

a first switch that couples the card connector socket to a signal bus;

a second switch that couples the card connector socket to a power bus;

a sensor to sense a predetermined condition on the power bus;

a signal bus arbitrator that grants access to the signal bus;

a cover plate to mate with said housing to contain electromagnetic radiation therein;

a third switch that detects motion of the cover plate relative to said housing;

at least one conductor transmitting status signals; and a controller responsive to signals outputted from the sensor, the signal bus arbitrator, the third switch and the at least one conductor to generate independent control signals that control the first switch or the second switch to activate or deactivate the power bus or the signal bus at the card connector socket.

3. The hot plug subsystem of claim 2 wherein the third switch includes an optical switch.

4. The hot plug subsystem of claim 3 further including a Reset Signal Line for transmitting a reset signal outputted from the controller.

5. A method for controlling hot-plugging a card to a socket of a processor base machine, said method including the steps of:

(a) detecting that the card is inserted in to the socket;

(b) detecting that a faceplate which restricts electromagnetic radiation within a housing of said machine is securely attached to said housing;

(c) using a switch to electrically couple a power bus of said processor base machine to the socket;

(d) detecting that the card power is good;

(e) detecting that card logic is ready;

(f) obtaining ownership of the signal bus of said processor based machine; and (g) electrically coupling the signal bus to the socket.

6. A method for controlling hot-plugging a card out of a socket of a processor base machine, said method including the steps of:

(a) detecting that a faceplate that coacts with a housing to contain electromagnetic radiation is removed from the housing of said processor base machine;

(b) requesting and detecting that ownership of the signal bus of said processor based machine is given to a controller;

(c) activating a second switch with the controller to electrically disconnect the signal bus from the socket;

(d) activating a second switch with the controller to electrically disconnect the power bus of said processor based system from the socket; and (e) removing the card from said socket.

7. The method of claim 6 further including the step of:

after step (c), resetting electrical devices on the card; and releasing ownership of the signal bus.

8. A hot plug subsystem comprising:

a card connector socket;

a first switch that couples the card connector socket to a signal bus;

a second switch that couples the card connector socket to a power bus;

a sensor to sense a predetermined condition on the power bus;

a signal bus arbitrator that grants access to the signal bus;

a cover plate;

a third switch that detects motion of the cover plate;

at least one conductor transmitting status signals; and a controller responsive to signals outputted from the sensor, the signal bus arbitrator giving control of the signal bus to said controller, the third switch or the at least one conductor to generate Independent control signals that control the first switch or the second switch to activate or deactivate the power bus or the signal bus at the card connector socket.

* * * * *